US009785981B2

(12) United States Patent
Grasso et al.

(10) Patent No.: US 9,785,981 B2
(45) Date of Patent: Oct. 10, 2017

(54) AUTHENTICATION SYSTEM AND METHOD TO IMPROVE TRUST IN PUBLIC REVIEWS

(71) Applicant: Xerox Corporation, Norwalk, CT (US)

(72) Inventors: Maria Antonietta Grasso, Grenoble (FR); Nicolas Guerin, Notre-Dame-de-Mésage (FR); Frédéric Roulland, Le Versoud (FR)

(73) Assignee: XENOX CORPORATION, Norwalk, CT (US)

( * ) Notice: Subject to any disclaimer, the term of this patent is extended or adjusted under 35 U.S.C. 154(b) by 397 days.

(21) Appl. No.: 14/594,425

(22) Filed: Jan. 12, 2015

(65) Prior Publication Data

US 2016/0203527 A1 Jul. 14, 2016

(51) Int. Cl.
*G06F 21/31* (2013.01)
*G06Q 30/02* (2012.01)
*H04L 29/12* (2006.01)

(52) U.S. Cl.
CPC ..... *G06Q 30/0282* (2013.01); *G06Q 2220/10* (2013.01)

(58) Field of Classification Search
None
See application file for complete search history.

(56) References Cited

U.S. PATENT DOCUMENTS

| 2011/0187642 | A1* | 8/2011 | Faith | G06F 1/1694 345/158 |
|---|---|---|---|---|
| 2011/0208418 | A1* | 8/2011 | Looney | G06Q 30/06 701/532 |
| 2014/0201066 | A1 | 7/2014 | Roux et al. | |

OTHER PUBLICATIONS

Recco: A Recommendation System for Youtube Rss Feeds. Krishnakumar, Anita. UCSC IRKM(2007).*
LOcation Explorer with information Services: A Mobile Application to Deliver Location-Based Web Services. Ma et al. IEEE(2013).*
Coordinating Crowd-Sourced Services. Moamen et al. IEEE(2014).*
Location Based Service for Restaurants. Bhebhe, Leo. 2007.*
Business Impact of Online Institutional Recommendation. Ion et al. LNICST21(2009).*
Hu, Nan, et al., "Manipulation of online reviews: An analysis of ratings, readability, and sentiments," Decision Support Systems, vol. 52, Issue 3, pp. 674-684 (Feb. 2012), Abstract only, downloaded at http://www.sciencedirect.com/science/article/pii/S0167923611002065.
Huffington Post, "Yelp Extortion: Sacramento Man Tries to Blackmail Restaurant With Bad Review," pp. 1-2 (May 30, 2012), downloaded at http://www.huffingtonpost.com/2012/05/30/yelp-extortion-sacramento_n_1556207.html.

(Continued)

*Primary Examiner* — Venkat Perungavoor
(74) *Attorney, Agent, or Firm* — Fay Sharpe LLP (57) ABSTRACT

A method for authentication of user reviews includes providing a user certificate to a user's mobile device. A transaction log is received from the mobile device. The transaction log includes an encrypted tag identifier which has been transmitted to the mobile device from a review tag at a location where a service is provided by a service provider when the review tag has verified the validity of the user certificate. The encrypted tag identifier is decrypted to identify the service provider. The user is prompted to submit a review of the service provided by the service provider.

19 Claims, 4 Drawing Sheets

(56) References Cited

OTHER PUBLICATIONS

Johnson, Katie, "Review websites try to thwart false customer ratings," Boston Globe, pp. 1-4, Sep. 25, 2013, downloaded at http://www.bostonglobe.com/business/2013/09/24/fake-online-reviews-proliferate-fraud-detection-efforts-grow/aWsy3I5xQAfJxczMySMMKL/story.html.

Marx, Rebecca Flint, "The Toxic, Abusive, Addictive, Supportive, Codependent Relationship Between Chefs and Yelpers," San Francisco Magazine, pp. 1-5 (Jul. 28, 2014), downloaded at http://www.modernluxury.com/san-francisco/story/the-toxic-abusive-addictive-supportive-codependent-relationship-between-chefs-an.

Neidlinger, Julie, "This is Social Media blackmail," Todaymade Blog pp. 1-9(2013), downloaded at http://todaymade.com/blog/social-media-blackmail/.

Ott, Myle, "Finding deceptive opinion spam by any stretch of the imagination," Proc. 49th Annual Meeting of the Assoc. for Computational Linguistics: Human Language Technologies (HLT '11), vol. 1, pp. 309-319 (2011).

Rao, Leena, "AmEx and TripAdvisor Team Up to Allow Card Members to Get Credit for Travel Reviews and Access Spend Data," TechCrunch, pp. 1-6 (Oct. 8, 2013), downloaded at http://techcrunch.com/2013/10/08/amex-and-tripadvisor-team-up-to-allow-card-members-to-get-credit-for-travel-reviews-and-access-spend-data/.

Webb, Sam, "'Give us free meals or I'll put a bad review on TripAdvisor': Anger at blackmailers using online ratings website to extort free rooms and dinners from hotels and restaurants," Dailymail.co.uk, pp. 1-3 (May 8, 2014) downloaded at http://www.dailymail.co.uk/news/article-2623290/Give-free-meals-III-bad-review-TripAdvisor-Anger-blackmailers-using-online-ratings-website-extort-free-rooms-dinners-hotels-restaurants.html.

Tripadvisor, "Review Moderation and Fraud Detection," pp. 1-4 (2014), downloaded at http://www.tripadvisor.com/vpages/review_mod_fraud_detect.html.

American Express, "TripAdvisor / American Express partnership FAQ," pp. 1-6, downloaded at https://sync.americanexpress.com/TripAdvisor/FAQ on Oct. 22, 2014.

Tripadvisor, "Discover more with American Express & TripAdvisor," pp. 1-2, downloaded at http://www.tripadvisor.com/Amex on Oct. 22, 2014.

\* cited by examiner

AUTHENTICATION SYSTEM AND METHOD TO IMPROVE TRUST IN PUBLIC REVIEWS

BACKGROUND

The exemplary embodiment relates to public reviews of services and finds particular application in connection with a system and method for authentication of reviews submitted to a review website.

When choosing a new service, such as dining at a restaurant or staying at a hotel, it is common practice to seek the advice of people who have already used the service. Internet review sites have replaced word-of-mouth and guide books as common sources of such advice. Review sites allow customers to post comments and provide ratings in a public way. Customers increasingly use the public ratings to make their decisions and businesses have come to understand that this is a key advertising instrument. The public ratings provide the ability to express satisfaction or, more commonly, dissatisfaction with a service, to put pressure on establishments to keep their services up to the level of their prices, and to push for better service overall. However, the ratings are subject to abuse by both customers and businesses. Business owners may post fake positive reviews, while their competitors may post fake negative ones. The Internet review sites may put in place mechanisms to control trustworthiness. For example, by screening out reviews from close geographical proximity to each other or the service location, fake reviews generated by business owners may be reduced. Relatives may be prohibited from writing reviews and there may be an editorial board checking every rating before publishing it. These steps, however, are generally not enough to screen out all fake reviews. For example, a large network of friends of the owner can write comments and reviews. The significance of having good reviews has also lead to the emergence of a hidden market for fake reviews, with people writing them for a fee. This ease of generating fake reviews, good or bad, depending on whether the source is the business owner or a competitor, has caused problems for businesses that may have their business impacted and for customers, who are not able to rely on the accuracy of the reviews.

One approach to control the source of reviews is to provide customers with paper flyers, where a flash code is printed, that will enable the customer to access the review service. Such approach, however, provides a very weak protection, since the flyers can be very easily copied and distributed to non-customers. A more sophisticated approach allows credit card holders to post a review on a review site regarding a service for which they have paid with a specific credit card. The review can then be labeled as being that of a verified customer. This approach is of limited use where different credit cards or cash are being used for the transaction, or when several people make use of a service paid for by only one of them.

Some existing approaches for identifying fake reviews use automated programs which detect signals of potential irregularities, such as a large number of people writing reviews for the same hotel. Such systems allow potentially fraudulent comments to be flagged for review by human moderators. Also some data or text analytics techniques are used in order to detect a posteriori false reviews. These methods have drawbacks, including that the reliability of the detection algorithms is not perfect and in the case of detection of a posteriori false reviews, the reviews may have been online for some time before a problem is detected and may have already had some negative influence on the readers.

There remains a need for a system and method for improving the ability to verify that a review of a service is submitted by a customer and thus improve the trust placed in public ratings.

INCORPORATION BY REFERENCE

The following reference, the disclosure of which is incorporated herein by reference, is mentioned:

U.S. Pub. No. 20140201066, published Jul. 17, 2014, entitled SYSTEM AND METHOD FOR ENABLING TRANSACTIONS ON AN ASSOCIATED NETWORK, by Pascal Roux, et al. discloses a method for wireless payment and information collection.

BRIEF DESCRIPTION

In accordance with one aspect of the exemplary embodiment, a method for authentication of user reviews includes providing a user certificate to a user's mobile device. A transaction log is received from the mobile device, the transaction log including an encrypted tag identifier which has been transmitted to the mobile device from a review tag at a location where a service is provided by a service provider, after the review tag has verified the validity of the user certificate. The encrypted tag identifier is decrypted to identify the service provider. Provision is made for the user to submit a review of the service provided by the service provider.

In accordance with another aspect of the exemplary embodiment, a system for authentication of user reviews includes a certificate generator which provides a user certificate to an associated mobile device of a user. A validation component receives a transaction log from the mobile device, the transaction log having been transmitted to the mobile device from a review tag at a location where a service is provided by a service provider after the review tag has verified the validity of the user certificate. A verification component decrypts an encrypted tag identifier to identify the service provider, the encrypted tag identifier being included in the transaction log received from the mobile device. A review submission component provides for the user to submit a review of the service provided by the service provider.

In accordance with another aspect of the exemplary embodiment, a method for authentication of user reviews includes providing a review tag to each of a set of service providers. Each of the review tag includes a key for decrypting user certificates to generate a respective user identifier. Each review tag also includes instructions for generating a transaction log based on the user identifier and a respective tag identifier, which are encrypted. The tag identifier is associated, in memory of a review authentication system, with the service provider. Each review tag also includes a short range transceiver. The method further includes registering a user to a submit reviews to the review authentication system and providing a user certificate to the user's mobile device, the user certificate including a user identifier for the registered user. A transaction log is received from the mobile device. The transaction log includes the encrypted tag identifier of one of the review tags. The transaction log has been transmitted to the mobile device from the one of the review tags by the short range transceiver of the review tag at a location where a service is provided by one of the service providers. The encrypted tag identifier is decrypted and the service provider identified from the tag identifier. The user is permitted to submit a review of the service provided by the service provider for verification by the review authentication system.

DETAILED DESCRIPTION

To address the problem of lack of trust in public reviews, the exemplary system and method associate the use of and/or payment for a service with a unique identifier, such as a code or token, referred to herein as a tag ID, that is used for authentication at the time of writing or submitting a review for that service. This ensures that the person holding the code has physically visited the establishment where the service took place, and possibly paid for it. Obtaining the unique identifier is made easy for real customers, whereas for others seeking to write a fake review, the cost of obtaining the unique identifier is a strong disincentive. The exemplary system allows trusted reviews of a service to be provided on the review site.

Figure 1:
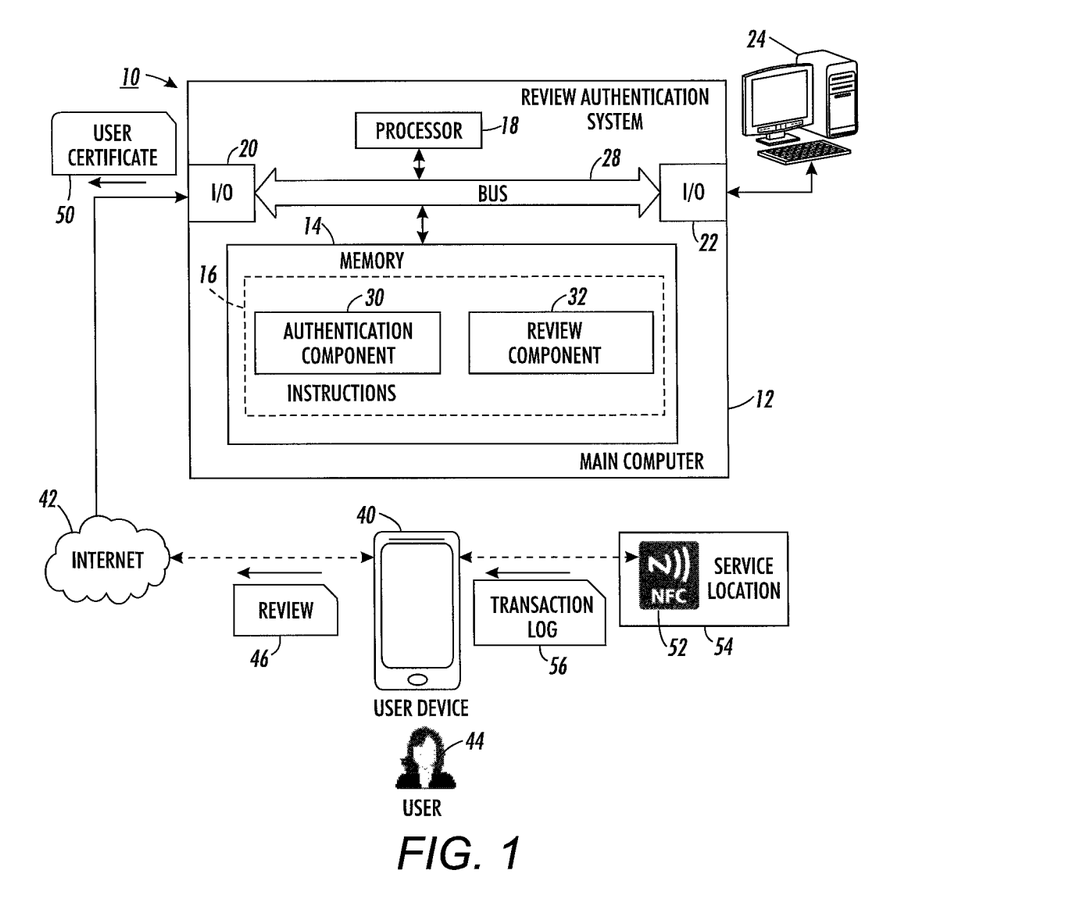
FIG. 1 is a functional block diagram of a system for authentication of reviews in accordance with one aspect of the exemplary embodiment.

With reference to FIG. 1, a functional block diagram of a computer-implemented system 10 for authenticating reviews is shown. The illustrated system 10 includes a main computer 12 including memory 14 which stores instructions 16 for performing part of the method illustrated in FIG. 2 and a processor device 18 in communication with the memory for executing the instructions. The main computer 12 also includes one or more input/output (I/O) devices 20, 22, such as a network interface 20 and a local input output interface 22. The local I/O interface 22 may communicate with a reviewer computing device 24. The various hardware components 14, 18, 20, 22 of the system 10 may be all connected by a data/control bus 28.

Figure 3:
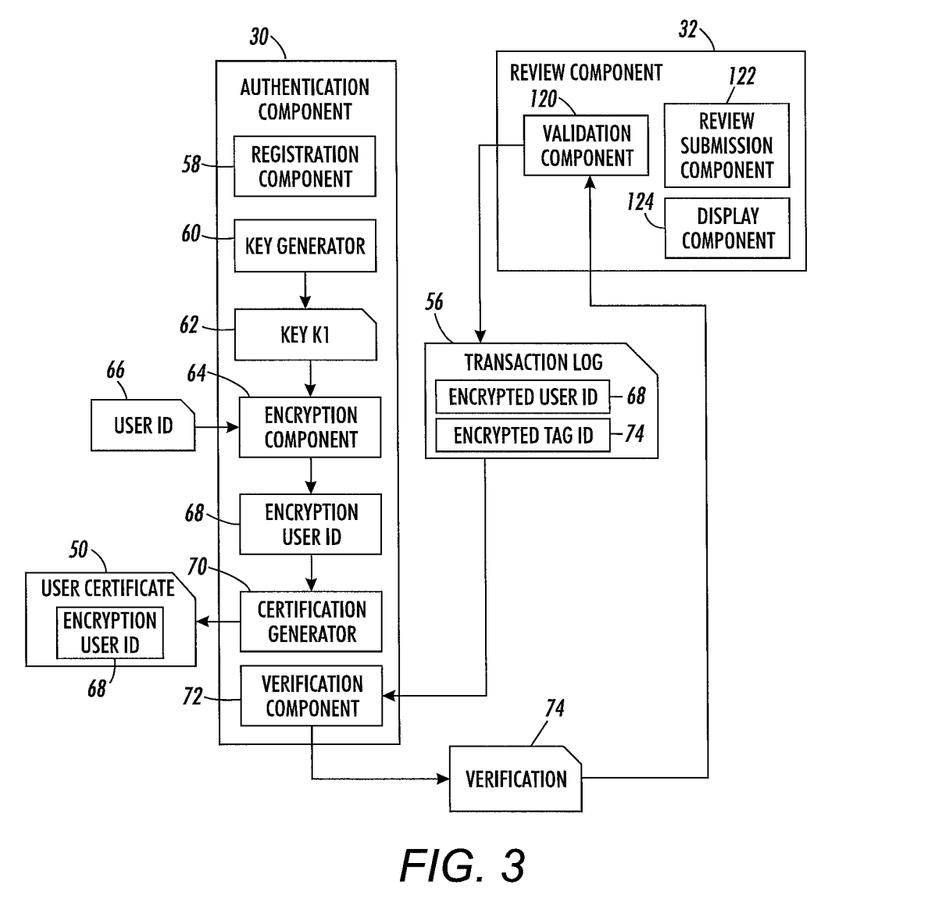
FIG. 3 is a block diagram of the authentication component and review component of the system of FIG. 1.

The software instructions 16 include an authentication component 30, and a review component 32, which are described in further detail with reference to FIG. 3. As will be appreciated, these components may be hosted by separate communicatively-connected computing devices, although for convenience they are illustrated as being hosted by a single computer 12.

The authentication component 30 and review component 32 communicate with a mobile computing device 40, via wireless connection 42, such as the Internet. The mobile computing device 40 may be a smartphone or tablet computing device operated by a user 44, such as a customer who wishes to submit reviews 46 of services for posting on a public review site. In order to submit an authenticated review 46, the user obtains a user certificate 50, which is stored on the mobile device 40. The certificate 50 is communicated to a review tag 52, which is a physical device. Each review tag 52 can be physically located at a service location 54, where it is used to create a transaction log 56. The transaction log 56 is used to authenticate the user's review 46 of the service provided at the location 54. The mobile device 40 is capable of contactless interactions with the tag 52, e.g., a Near Field Communication (NFC)-enabled smartphone device. The mobile device 40 and review tag 52 are described in further detail with reference to FIG. 4. As will be appreciated, while FIG. 1 illustrates only a single mobile device 40 and a single tag 52, there may be many such mobile devices in communication with the central system 10 and many tags 52 distributed throughout one or more different locations of different service providers.

The authentication component 30 provides authentication service where reviewers are required to register before leaving a review. The registration may be valid for multiple service providers utilizing the same application, with the user only having to register once with the authentication component 30 prior to reviewing the first. As illustrated in FIG. 3, the authentication component includes a registration component 58 which provides a user interface on the mobile device 40 through which a user enters personal information sufficient to uniquely identify the user, such as name, social security number or other government-issued identifier, home address, combination thereof, or the like. A master key generator 60 generates and/or retrieves a stored master key K1 62, which is used for encryption and decryption. The encryption method can be based, for example, on the Advanced Encryption Standard (AES), which is a symmetric encryption standard, established by the U.S. National Institute of Standards and Technology (NIST). Other symmetric cryptosystems, such as 3DES, or asymmetric cryptosystems, such as RSA, ECC, and the like may alternatively be used.

The authentication component 30 further includes an encryption component 64, which encrypts a user identifier 66 with the key 62 to generate an encrypted user identifier 68. The user identifier 66 may correspond to any alphanumeric sequence of characters. The user identifier 66 may be selected by a user or selected automatically by the authentication component 30 and may be stored in a user profile for that user, e.g., in system memory 14. A certificate generator 70 generates the user certificate 50, which incorporates the encrypted identifier 68. Subsequently, when a transaction log 56 is received from the mobile device 40, the verification component 72 decrypts the transaction log 56 with the key 62, when requested to do so by the review component 32. The verification component 72 outputs a verification 74 that the transaction log is valid if the user ID decrypted from the transaction log 56, matches the user ID 66 of the user and a tag ID, decrypted from an encrypted tag ID 76 in the transaction log, matches a tag ID 78 of a tag 52 used by a service provider that is recognized by the system (FIG. 4).

Figure 2:
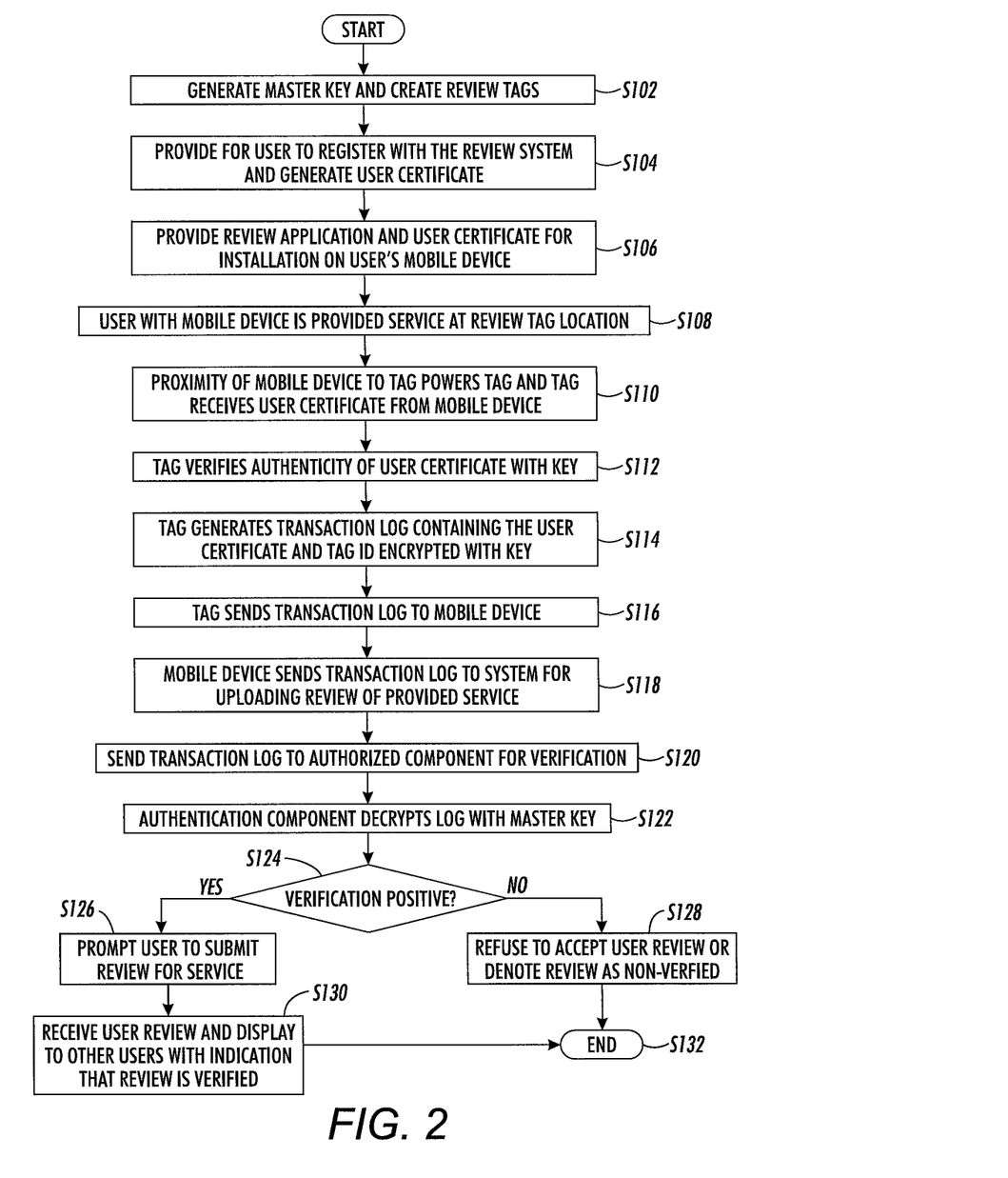
FIG. 2 is a flow chart illustrating a method for authentication of reviews in accordance with another aspect of the exemplary embodiment.
Figure 4:
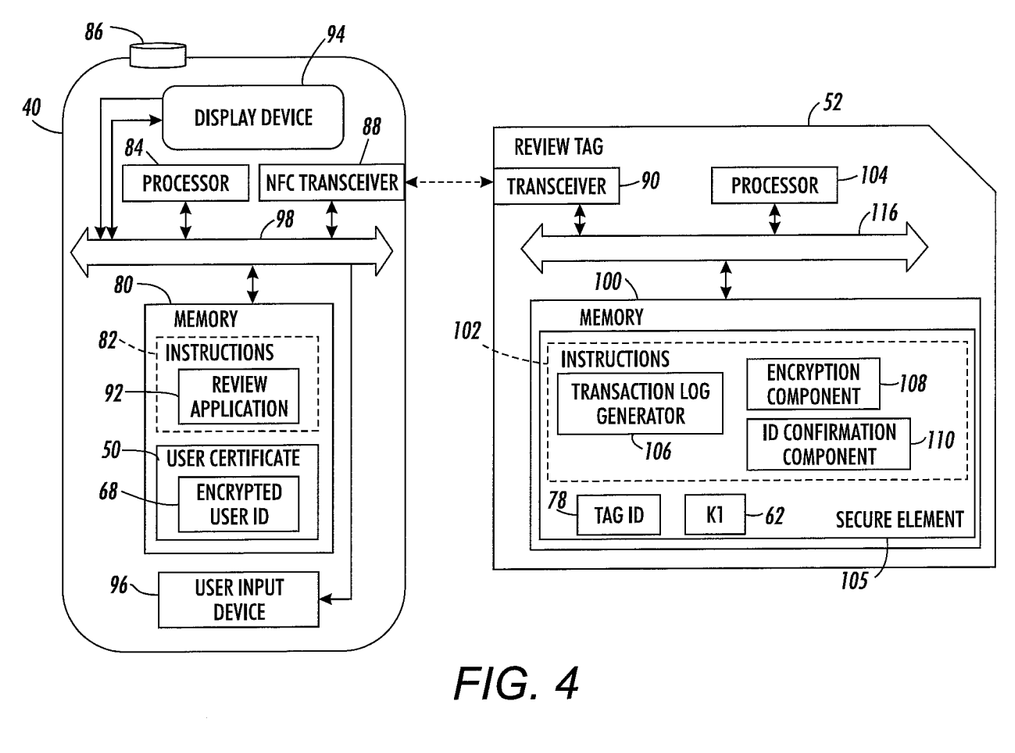
FIG. 4 is a block diagram of the mobile computing device and review tag of the system of FIG. 1.

With continued reference to FIG. 4, the mobile device 40 includes memory 80 which stores instructions 82 for performing part of the method illustrated in FIG. 2 and a processor 84 in communication with the memory 80 which executes the instructions. The mobile device communicates wirelessly with external devices via a long range wireless transceiver 86. The wireless transceiver 86 communicates, for example, with cell phone towers within a radius of at least 1 kilometer. The mobile device 40 also includes a short range wireless transceiver 88, which communicates with a corresponding short range transceiver 90 on the review tag 52. Each short range transceiver 88, 90 has a limited communication range of less than 2 meters, such as up to 50 centimeters, or up to 20 centimeters, or up to 10 centimeters, or up to 5 centimeters.

The exemplary short range transceivers 88, 90 employ a Near Field Communication (NFC) protocol. NFC is a standards-based short-range wireless connectivity technology available for smartphones and other devices. The short-range wireless technologies employed in NFC operations typically require a distance of 10 cm or less. NFC employs an initiator and a target, with the initiator capable of actively generating an RF field that can power a passive target or communicate with an active target. This arrangement allows for the use of targets having a very simplistic form, such as tags, key fobs, stickers, cards, etc., which do not require batteries. NFC tags may be read-only or rewriteable, and may be custom encoded. NFC tags may be configured to provide various communication speeds, memory, security, data storage, write endurance, etc. In some instances, the target may include a power source, e.g., NFC peer-to-peer communications. Common NFC protocols used in smartphones include Broadcom BCM20793, NXP PN65N, and Inside Secure (SECUREAD NFC 972-DC-C6).

While the exemplary tags 52 serve as passive targets powered by the mobile device, other short range communication devices 88, 90, such as Bluetooth beacons (with associated processing capabilities), are also contemplated. These devices can identify the exact location of the respective mobile device 40 and review tag 52, allowing the tag to verify that the mobile device is within a predefined range (e.g., up to 2 meters, or up to 50 cm) from the tag. When the mobile device is within the predefined range from the tag, the tag may trigger an application which activates communication with the mobile device. One or both of the communication devices 88, 90 may provide more than one short range communication protocol.

A review application 92 installed in memory 80 of the mobile device 40 includes instructions for controlling the interactions with the review tag 52 and the review authentication system 10. The user certificate 50, including the encrypted user ID 68, is also stored in memory 80. The review application 92 includes instructions for storing user certificate 50 in non-transitory memory 80 and for causing the transceiver 88 to transmit the certificate 50 with the encrypted user ID to the proximate review tag 52. The review application 92 also includes instructions for receiving, via the transceiver 88, a transaction log 56 from the review tag which has been generated by the review tag specific to that user and storing it in memory 80. The review application 92 includes instructions for transmitting the transaction log 56 to the review component when the user requests to submit a review 46 of the related service and instructions for generating a user interface for inputting the review.

The mobile device 40 further includes a display device 94, such as an LCD screen, AMOLED, LED, RETINA, touchscreen display, or the like for displaying instructions to the user, and a user input device 96, such as a keypad, touch screen or the like for inputting user commands, submitting personal information to the authentication component 30, and inputting the text and/or a rating for a review 46 when prompted to do so by the review application 92. Hardware components 80, 84, 86, 88, 94, 96 communicate via a data/control bus 98. The mobile device 40 is powered by an integral power supply, such as a battery (not shown).

The mobile device 40 can be any device owned by the user and able to run an application 92 for interacting with the network for communication with the system 10. Examples of such a mobile device include mobile phones, personal data assistants, tablets, and other personal electronic devices. In one embodiment, each mobile device 40 may be implemented as a smartphone employing an operating system such as iOS, ANDROID, BLACKBERRY, WINDOWS, or the like, or any device having NFC capabilities. The data communications links 42 between the central system 10 and the mobile device 40 may be accomplished via any suitable channel of data communications such as wireless communications, for example Bluetooth, WiMax, 802.11a, 802.11b, 802.11g, 802.11(x), a proprietary communications network, infrared, optical, the public switched telephone network, or any suitable wireless data transmission system. In one embodiment, the mobile devices may communicate with the central system 10 via a cellular data network, e.g., via a cellular data network, e.g., using $3^{rd}$ generation mobile phone standards (3G), $4^{th}$ generation standards (4G, 4G LTE, WiMax), EV-DO, standalone data protocols, or the like. It will be appreciated that each mobile device 40 need not maintain a constant connection to the central system 10.

With continued reference to FIG. 4, the review tag 52 is supplied to service providers to be employed in locations 54 under their control that are eligible to trusted reviews. The review tags can be produced cheaply (e.g., less than $2 per unit). The exemplary review tags 52 are autonomous, using induced power from the proximate mobile device 40 to operate, so they do not need batteries. The tag 52 need not be connected to any network, thus allowing the positioning of the tag on a variety of different surfaces. The tag may be fixed in position at the service provider's location or may be movable. The tag can be affixed, for example, to furniture, walls, a check presenter, or otherwise associated with a location 54 delivering services.

The transceiver 90 of the tag 52 may correspond to any suitable component capable of establishing short range (less than two meters) bi-directional communication between the tag 52 and the mobile device 40. The exemplary review tag 52 includes a low-cost Near Field Communication (NFC) device 90, powered or unpowered, which is capable of communication with the transceiver 88 of an NFC-enabled mobile device 40 over a short distance, e.g., up to 2 meters, or up to 50 cm, or up to 20 cm, or up to 10 cm, or up to 5 cm.

The review tag 52 includes memory 100 which stores instructions 102 for performing part of the method illustrated in FIG. 2 and a processor 104 in communication with the memory 100 for executing the instructions. In the exemplary embodiment, the induced power from the closely positioned mobile device 40 provides the power for the processor to implement the instructions 102, as well as for the review tag to communicate with the mobile device. When the mobile device is no longer within range of the tag 52, the tag no longer has power and goes to sleep. The review tag 52 can include an NFC smart card that contains a secure element 105. The secure element 105 is a dynamic environment in which application code and application data can be securely stored and administered and in which secure execution of applications occur. The element resides in a highly secure crypto chip (usually a smart card chip). The instructions 102 stored therein include a transaction log generator 106, an encryption component 108, and an ID confirmation component 110. Each review tag also stores the master encryption key K1 62, and a unique tag identifier (tag ID) 78. The review component 32 is able to retrieve the relationship between each tag ID 78 and the service with which it is associated, from system memory.

The encryption component 108 is able to decrypt an encrypted user ID 68 stored in the user certificate 50 received by NFC from the mobile device using the master key 62. The ID confirmation component 110 confirms the user ID if it corresponds in general form to that of a user ID, such as having a required minimum/maximum number of characters of prescribed type(s) (the ID confirmation component does not need to verify that it matches the user ID of the user, although this is also contemplated). The encryption component 108 is then able to re-encrypt the confirmed user ID, using the master key 62, as well as encrypting the tag ID 78, using the master key 62, if this has not been done previously. As will be appreciated, different master keys could be used for decryption of the encrypted user ID, re-encryption of the user ID, and/or encryption of the tag ID. The tag ID 78 and user ID 66 may be performed in a single step by signing a transaction log that contains them with the master key.

In some embodiments, the mobile device 40 may also provide the time, date, and/or location (e.g., cell-tower position, GPS) to the tag 52, which is/are incorporated into the transaction log 56. The encrypted transaction log 56 is then communicated from the tag 52 to the mobile device 40, by NFC. In the event that the tag is not able to decrypt a user ID 66 from the certificate 50, a rejection message may be sent from the tag 52 to the mobile device 52.

Hardware components 90, 100, 104 of the review tag communicate via a data/control bus 116.

Returning to FIG. 3, the review Component includes a validation component 120 which prompts the review application 92 to submit the signed transaction log 56 when the user 44 of the mobile device wishes to submit a review 46 for the particular service where the transaction log was generated. The validation component 120 submits the transaction log 56 to the authentication component. The encryption component 64 decrypts the transaction log 56 with the master key 62 and submits the results to the verification component 72. The verification may check that the retrieved user ID matches a stored user ID for that user and check that the retrieved tag ID matches a stored tag ID of a service provider. The verification component 72 outputs a verification 74 which identifies the user ID 66 and tag ID 112 stored in the transaction log (and/or corresponding user information and service provider information, such as a name and/or other identifying information). The verification 74 is sent to the review component.

The review component 32 includes a review submission component 122, which accepts a review 46 from the user corresponding to the identified user ID for a service location matching the decrypted tag ID 78. A display component 124 provides for displaying the review to other users on a review website, together with an acknowledgement that the review is verified (e.g., a notice, such as "by a verified user of this service"). The review component may send the verified review to the review website for posting. In some embodiments, one or more additional automated algorithms is/are implemented for validating reviews based on factors such as the number of reviews submitted by the same reviewer for this service, the number of other reviews of this service, and so forth. In some cases, a review may be flagged for manual review by a human reviewer on the associated reviewer computing device 24, based on one or more of these factors.

The computer system 10 may include one or more computing devices 12, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memories 14, 80, 100 of the various computing devices 12, 40, 52 may each represent any type of non-transitory computer readable medium such as random access memory (RAM), read only memory (ROM), magnetic disk or tape, optical disk, flash memory, or holographic memory. In one embodiment, the memory 14, 80, and/or 100 comprises a combination of random access memory and read only memory. In some embodiments, the processor and memory of a respective device may be combined in a single chip. Memory 14, 80, 100 stores instructions for performing the exemplary method as well as the processed data.

The digital processor devices 18, 84, 104 can be variously embodied, such as by a single-core processor, a dual-core processor (or more generally by a multiple-core processor), a digital processor and cooperating math coprocessor, a digital controller, or the like. The digital processor 18, 84, 104, in addition to executing instructions 16, 82, or 102 may also control the operation of the respective computing device 12, 40, 52.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

With reference to FIG. 2, a method for authenticating a review is illustrated. The method begins at S100.

At S102, a master key 62 is generated by the key generator 60, which is used to create review tags 52, each with a respective copy of the master key 62. The master key 62 may be a symmetric key, an asymmetric key, or an asymmetric key pair in which case, the tag may receive both keys in the key pair providing for decryption and encryption or may use a separate key for encryption. The review tags 52 are provided to service providers for use in their different service locations 54. The unique tag identifier 78 for each tag is stored in system memory 14, along with a description of the respective location or business where the service is provided. This stored information may be incorporated into the review 46 before it is posted on the review website.

At S104 a user 44 registers to the review system 10 through the authentication service component 30, by submitting details about the user's identity. An account is generated for the user and stored in system memory. The account may include the user's unique identifier 66. A user certificate 50 is generated by the certificate generator 70. The user certificate includes the user identifier 66, which has been encrypted with the key 62.

At S106, once registered, the authentication component, or another component of the system 10, provides the review application 92, and the user certificate 50 containing the encrypted user ID 68, to the user for installation on his or her mobile device 40. The user downloads the certificate into memory 80 of the user's mobile device and installs the review application in memory 80 for implementing by the processor 84 of the mobile device. The certificate 50 is later used to authenticate the user.

At S108, the user transports the mobile device 40 containing the certificate 50 to a service location 54 where the user may experience a specific service. At the service location, a review tag 52 is placed by the business owner in order to provide a reasonable guarantee that the user has been physically in close proximity with the place at which the service is provided. For example, hotels can provide tags 52 fixed in guest rooms (i.e., which are not easily removed by users). Storekeepers can place a tag 52 next to cash machines, or within the packaging box of a product. Restaurants may include tags 52 in their check presenters that the waiter gives with the bill at the end of a meal.

At S110, user brings the mobile device 40 into close proximity with the review tag 52, for example, by tapping the mobile phone on the tag or at least bringing the mobile phone and the tag into very close range. Once in proximity, the NFC transceiver 88 of the mobile device may generate an RF field which is capable of powering the tag 52, e.g., by induction. This initiates a transaction between the tag and the mobile phone. In this transaction, the tag 52 receives the user certificate 50 through NFC. The tag verifies the authenticity of the user certificate 50 with the key K1 (S112). Then the tag 52 generates and encrypts a transaction log 56 (S114), and sends it back to the mobile phone through NFC (S116). For example, the transaction log can contain the user ID 68 and the tag ID 78, encrypted with K1 62. In the case where a payment is made for the service, payment information (such as a token) may also be included in the transaction log. Other authentication protocols may be initiated between the mobile device 40 and the tag 52 prior to exchange of data 50, 56. In the event that a transaction log is/is not received from the tag 52, the application 92 may include instructions directing the mobile device 40 to generate some form of feedback to the user indicating either success or failure in completing the transaction with the tag. Suitable examples of such feedback include auditory, visual, tactile (vibration), or any combination thereof. Success and failure notifications may utilize different types of feedback or different versions of the same type.

When the user connects to the system 10 though the mobile device 40 for uploading a review of the service provided at the service location 54, the mobile device review application 92 sends the transaction log 56 that was collected from the tag 52 (S118).

At S120, the review component 32 contacts the authentication component 30 with the transaction log 56. At S122, the authentication component decrypts the transaction log 56 with K1 62 and verifies its validity and the identities of the user 44 and the service 54 associated with the tag 52. If at S124, the authentication service returns a positive verification 74, the review component prompts the user to submit a review 46 for the associated service (S126). Otherwise, at S128, the review is not accepted or is marked as not verified.

At S130, the display component 124 provides for the verified, submitted review to be posted such that when the accepted review 46 is displayed to other users, an indication that this review is genuine and verified, provided by the review system 10, is associated with the review.

The method ends at S132.

The secure aspects can be implemented as described in U.S. Pub. No. 20140201066. However, in the present system and method, there is no need to store transaction logs on the tag, and only one transaction is generally sent back to the phone. Additionally, it is not necessary to associate a credit card payment with the transaction on the tag. Therefore, the present method can be used in cases where the user wants to pay with another means, such as cash, or when the user wants to review a free service such as provided, for example, by a public administration. Another case is when several people experience a service together (e.g., dinner at a restaurant) but only one pays for everybody, the system can allow other participants to review the restaurant. Each user of the same service is able to receive a respective transaction log 56 from the tag 52 by contacting the tag with a respective mobile device 40.

The system and method provide an assurance that a service or product review is being provided by an actual customer or user, through the use of mobile phone and a smart tag, where the system can certify the identity of the user, the identity of the service or product, and the fact that the user's device 40 (and thus it is inferred the user) has been physically located at the place where the service is provided.

At least part of the method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the main computing device 12 (for example, an internal hard drive of RAM), or may be separate (for example, an external hard drive operatively connected with the computer 12), or may be separate and accessed via a digital data network such as a local area network (LAN) or the Internet (for example, as a redundant array of inexpensive of independent disks (RAID) or other network server storage that is indirectly accessed by the computer 12, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

The system may provide protection against one or more potential frauds, as follows.

Analysis of Potential Frauds

A consumer system such as this one should be resistant to amateur fraud, but also to more serious attacks, as it can directly impact businesses and as more and more organizations provide fraudulent review services.

The exemplary system is able to ensure that the person submitting a review has visited the place concerned by the review. So it needs to make sure that the reviewer is indeed who he claims to be (through authentication), and that he could not pretend he went to that place (from the tag ID).

Authentication:

In the exemplary embodiment, the user needs to log on to the authentication service to provide a review. An authentication mechanism can be used to verify the user ID based on the user certificate.

Tag Identifier:

Each review tag 52 has a unique tag ID 78, and only the review system 10 knows which tag ID corresponds to which service location 54. The tag ID 78 cannot be read from the tag as it is stored in the secure element 105. The tag ID cannot be read from a transaction log 56 either, as the log is encrypted, and only the tag 52 and the review system 10 possess the key 62 needed to decrypt the log 56.

An attacker who has access to a tag 52 and a phone 40 running the application 92 can only extract the encrypted transaction log 56, and the encrypted user ID 68 stored in the application, but cannot decrypt them.

Replay Attack

In order to prevent a replay attack, that would allow users to leave several reviews with only one transaction log 56, it is possible to add an extra security step. In one embodiment, this is provided on the server, where the review system may not allow more than one review from one user for one place during a certain period of time (e.g., one week). In another embodiment, this is achieved by using an incremental counter (or random number generator) on the tag. When a transaction is created, the tag adds the counter value (or random number) to the encrypted log and increments the counter. The server can then enforce a requirement that two reviews from the same user and tag cannot have the same counter value.

Fake Applications

An attacker may create a fake application that would imitate the real review application 92. This is a costly attack, and it is difficult to deploy, as the attacker would need to convince users to install the fake application. However, even if this were possible, the user cannot submit a review if the transaction log 56 is not valid. While the fake application 92 could submit a review using a different user identifier (e.g., by using a user ID 68 copied from another phone), or the application will submit a different review, the cost/benefit would be very high.

Tag Theft

A review tag 52 could be removed from one place, to allow unlimited reviews for that place. This can be addressed when the business owner reports the tag theft. By using the tag ID and the likely date of the theft, malicious reviews 46 can be identified and removed. Users who submitted fake reviews could also be blocked from submitting future reviews. Additionally, review tags could be set to expire after a given time, such as a week, month, or year (e.g., by storing the dates for which each tag is valid at the server). The business owner then replaces the expired tags from a secure supply and may receive a notice from the server if a review is associated with an expired tag ID.

Fake Tag

A service provider who is concerned about getting a bad review from a particular customer may want to provide him with a fake tag that will not allow him to leave a review. Or, a competitor may replace existing tags with fake ones to prevent the service provider from collect reviews. It would be difficult, however, to create a fake tag which simulates a real one.

For example, when the customer 44 taps his mobile device on the fake tag, the application 92 can check that the tag answers as expected and sends back a well-formed response. While it is possible to create a fake tag which does this, the risk may not justify its creation, because of the unfavorable cost/benefit for the attacker, due to the technical difficulties of programming such a tag. Also, the customer will quickly detect that there is a problem, as the review system 10 will not accept reviews in this case, and could report the business to the review site.

Leak of the Master Key

Suppose that a third party manages to obtain the master key 62. If this occurs, a new master key can be issued, all review tags replaced, and all application parameters are renewed. To limit the consequences, more than one master key may be created, for different regions and/or services. Leak of the master key is unlikely as the tags securely hold the key in a secure element.

The exemplary system and method thus described offer assurances concerning the identity of the user, the identity of the product or service, and that the two have been physically in contact or in close proximity. Due to these elements, fraudulent evaluations can be greatly reduced. In particular, false reviews generated to negatively impact the business are minimized since the review needs the reviewer to have been in contact with the tag. If the business owner places the tag in a location where there is control over who can come near it, there is an assurance that only customers will access it. It is in the interest of the business owner to maintain such control.

Additionally, false reviews generated by the business owner are limited by the complexity of the workflow. One reviewer cannot generate several reviews under different identities without repeatedly registering and installing the application under a false identity. Such fraud can be easily detected and/or limited by asking for proof of identity at the registration stage that is costly for the user to change, such as checking the mobile device identifier, the mobile phone number, and/or a user identifier such as a Social Security number. False reviews are then limited to the number of people which are potentially in contact with tag and willing to participate in the fraud. This limitation is even more challenging when the review is associated with a mobile payment. In this case, each false review would have to be associated with a false payment transaction, which makes it very costly and risky for a business owner to perpetrate a fraud.

The present method offers a level of security which is comparable to those in which the credit card company verifies that a purchase has been made before a review is verified. However the present system and method have the advantage that they are usable for a variety of purchases, e.g., different types of products and services, and not only those for which a payment is made with a credit card.

The exemplary system and method may be used in combination with existing systems for detection of fake reviews, such as those employing algorithms which are configured to detect indicators of false reviews. This may be useful for services that are not provided in a physical place. However, since the present method prevents posting false reviews beforehand, the cost/benefit ratio is expected to be much better.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for authentication of user reviews comprising:
providing a user certificate to a user's mobile device, the user certificate incorporating an encrypted user identifier, the encrypted user identifier having been generated by encrypting a user identifier that is unique to the user;
providing a review tag to be located at a service location, the review tag including a short range transceiver and being configured for:
with the short range wireless transceiver, receiving the user certificate from the user's mobile device,
verifying the validity of the received user certificate, the verification including decrypting the encrypted user identifier to authenticate the user,
creating a transaction log for a service, the transaction log including an encrypted tag identifier for the review tag, and
sending the transaction log to the user's mobile device;
receiving a transaction log from the mobile device, the transaction log including an encrypted tag identifier, which has been transmitted to the mobile device from the review tag at a location where a service is provided by a service provider, after the review tag has verified the validity of the user certificate;
with a key which is not possessed by the user's mobile device, decrypting the encrypted tag identifier in the received transaction log to identify the service provider; and
providing for the user to submit a review of the service provided by the identified service provider.

2. The method of claim 1, further comprising providing for displaying the submitted review of the service with an indication that the review is verified.

3. The method of claim 1, wherein the transaction log includes the user identifier re-encrypted by the review tag.

4. The method of claim 1, further comprising providing an application to the user's mobile device for sending the encrypted user identifier to the review tag and for receiving the transaction log from the review tag.

5. The method of claim 1, wherein the method further comprises supplying the review tag to the service provider.

6. The method of claim 5, wherein the review tag includes an encryption key for encrypting a tag identifier associated with the tag to generate the encrypted tag identifier.

7. The method of claim 6, further comprising retrieving an identifier of the service provider which is associated in system memory with the tag identifier.

8. The method of claim 5, wherein the review tag includes a key for decrypting an encrypted user identifier sent to the review tag by the mobile device.

9. The method of claim 1, wherein the review tag is configured for transmitting the transaction log wirelessly to the mobile device only when the mobile device is at a distance which is less than two meters from the review tag.

10. The method of claim 1, wherein the review tag communicates with the mobile device by Near Field Communication.

11. The method of claim 1, wherein the providing a user certificate to a user's mobile device comprises encrypting a user identifier with a key, the review tag including a key for decryption of the encrypted user identifier when the review tag receives the user certificate from the mobile device.

12. The method of claim 1, wherein the transaction log includes a verification of a payment for the service.

13. The method of claim 1, wherein the review tag is powered by an RF field generated by the mobile device.

14. A computer program product comprising non-transitory memory storing instructions which when executed by a computer, perform the method of claim 1.

15. A system for authentication of user reviews comprising memory which stores instructions for performing the method of claim 1 and a processor in communication with the memory which executes the instructions.

16. A system for authentication of user reviews comprising:
memory comprising:
a certificate generator which provides a user certificate to an associated mobile device of a user, the user certificate incorporating an encrypted user identifier, the encrypted user identifier having been generated by encrypting a user identifier that is unique to the user;
a validation component which receives a transaction log from the mobile device, the transaction log having been transmitted wirelessly to the mobile device from a review tag at a location where a service is provided by a service provider after the review tag has verified the validity of the user certificate, the transaction log including an encrypted taq identifier, the tag identifier being unique to the service provider, the review tag including a short range transceiver for wirelessly communicating the transaction log to the mobile device;
a verification component which decrypts an encrypted tag identifier with a key, which is not possessed by the user's mobile device, to identify the service provider, the encrypted tag identifier being included in the transaction log received from the mobile device; and
a review submission component which permits the user to submit a review of the service provided by the identified service provider; and
a hardware processor which implements the certificate generator, validation component, verification component, and review submission component.

17. The system of claim 16, further comprising a display component which provides for displaying the submitted review of the service with an indication that the review is verified.

18. The system of claim 16, further comprising a set of the review tags.

19. A method for authentication of user reviews comprising:
providing a review tag to each of a set of service providers, each review tag being a physical device including:
memory which stores:
a key for decrypting user certificates to generate a respective user identifier, and
instructions for generating a transaction log based on the user identifier and an encrypted tag identifier, the tag identifier being associated, in memory of a review authentication system, with the service provider, and
a short range transceiver for transmitting the transaction log wirelessly to a mobile device;
registering a user to a submit reviews to the review authentication system;

providing a user certificate to the user's mobile device, the user certificate including a user identifier for the registered user;

receiving a transaction log from the mobile device, the transaction log including the encrypted tag identifier of one of the review tags, the transaction log having been transmitted to the mobile device from the one of the review tags by the short range transceiver of the review tag at a location where a service is provided by one of the service providers;

decrypting the encrypted tag identifier;

identifying the service provider from the tag identifier; and permitting the user to submit a review of the service provided by the service provider to be verified by the review authentication system.

\* \* \* \* \*